May 23, 1967 G. M. RAPATA 3,320,712
FASTENER
Filed July 28, 1964
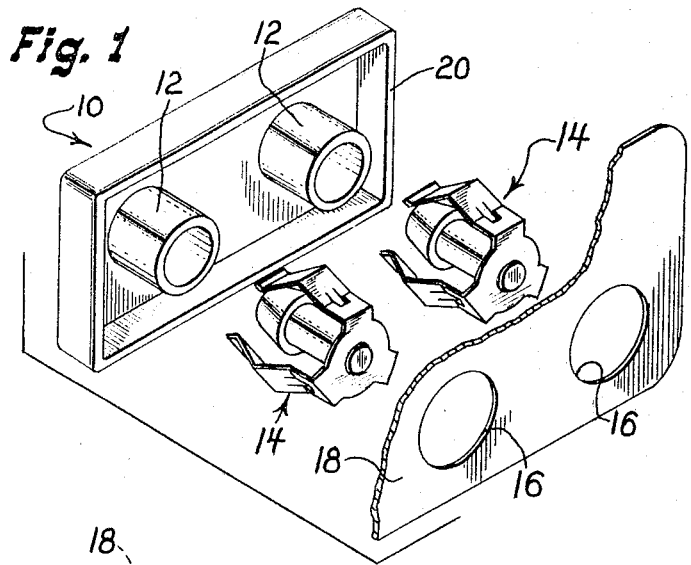
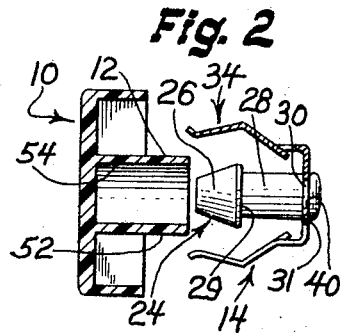
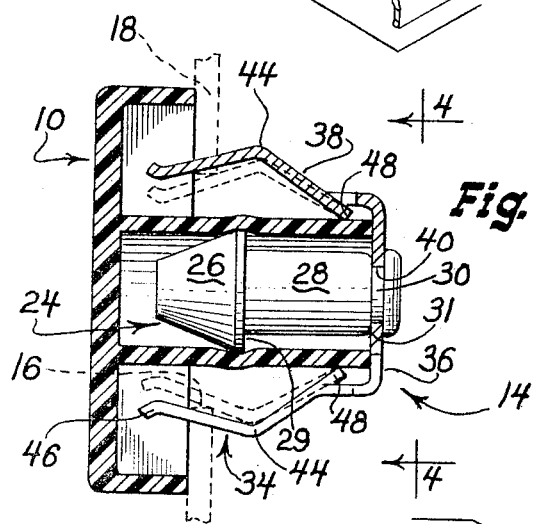
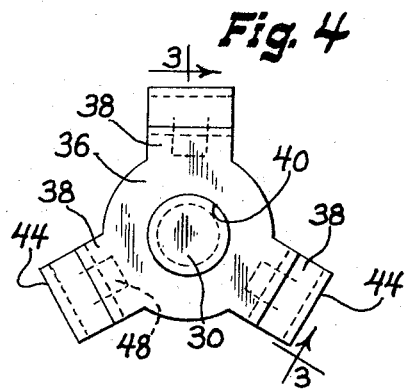
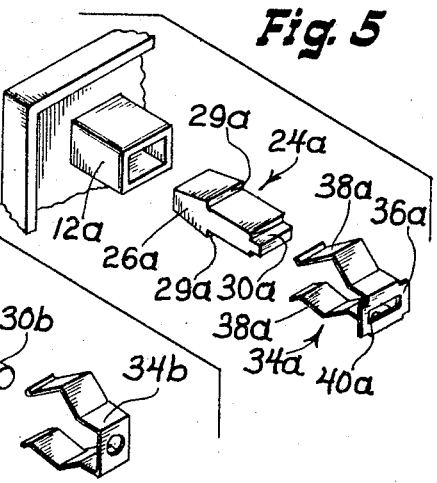
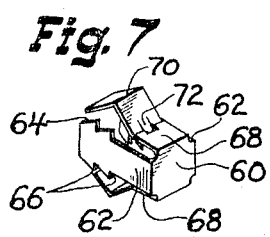
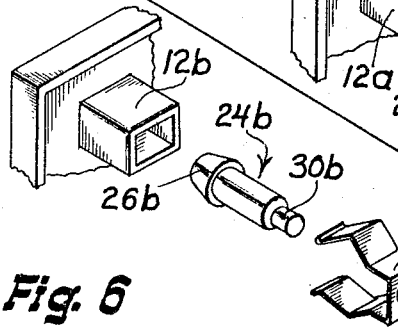
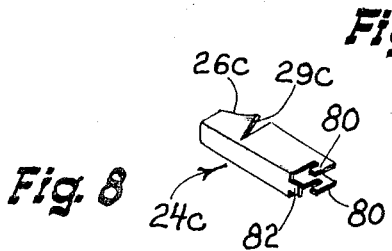
INVENTOR.
George M. Rapata
BY
His Att'y

United States Patent Office 3,320,712
Patented May 23, 1967

3,320,712
FASTENER
George M. Rapata, Park Ridge, Ill., assignor to Illinois Tool Works Inc., Chicago, Ill., a corporation of Delaware
Filed July 28, 1964, Ser. No. 385,589
9 Claims. (Cl. 52—511)

This invention relates to a fastener for securing a workpiece to an apertured panel. More particularly it relates to the mounting of workpieces having tubular or sleeve-type stud members extending rearwardly therefrom toward the panel to which they are to be mounted.

In the art of mounting panels or escutcheons, which serve as ornamental trim and name plates, to a housing, it is often common practice to provide a solid stud extending rearwardly to pass through an aperture in a housing and to thence have a fastener applied to the stud on the back side of the housing to retain the plate or escutcheon in position. It is common practice to make such escutcheons from plastic or die cast metals. A problem which arises in fabrication of devices of the described type is that a large solid stud, when die cast or injection molded as an integral part of the escutcheon, results in a "sink" mark on the forward face of the escutcheon coaxial with the solid stud. It has been found that sleeve type studs give substantially the same maximum strength in tension as a solid stud but eliminate the resultant sink mark prevalent with large solid studs.

An object of this invention is to provide a fastener for securing sleeve type studs to an apertured panel.

Another object is to provide an economical fastener which can be preassembled with a sleeve type stud and then snapped into assembly with an apertured housing or panel.

Further objects of the invention will become apparent when the specification is read in conjunction with the drawings wherein:

FIG. 1 is a perspective exploded view of a typical escutcheon having a tubular or sleeve type stud with which the fastener of this invention is to be associated and also shows the fastener and an apertured panel to which the escutcheon is to be mounted;

FIG. 2 is an exploded vertical cross sectional view of an escutcheon and a fastener of the type contemplated by this invention;

FIG. 3 is a vertical view in partial cross section showing a fastener of the type viewed along lines 3—3 of FIG. 4, embodying the principles of this invention assembled with the tubular sleeve of a typical escutcheon and showing in phantom its mounted position in an apertured panel;

FIG. 4 is an end view of the fastener contemplated by this invention as viewed along line 4—4 of FIG. 3, but with the escutcheon eliminated for purposes of clarity in illustration;

FIG. 5 is a fragmentary exploded view of a modification to the present invention;

FIG. 6 is an exploded fragmentary view of another modification of the present invention;

FIG. 7 is a perspective view of a further embodiment of the invention; and

FIG. 8 is a perspective view of a one piece fastening device of the type contemplated by this invention.

Referring now more particularly to the drawing wherein similar numerals are utilized to designate similar parts, and particularly, FIGS. 1-4, the invention contemplates a workpiece such as an escutcheon plate 10 having a plurality of tubular, sleeve-type stud members 12 extending rearwardly therefrom which are associated with fasteners 14, the latter each being adapted for acceptance in an aperture 16 of plate 18. The escutcheon 10, if desired, may be provided with a rearwardly extending peripheral flange 20 for engagement with the outer surface of the plate 18 to provide a finished appearance or to be utilized for sealing purposes.

A fastener 14 of the type contemplated by the present invention includes a stud portion 24 having coaxially disposed thereon a tapered or bullet shaped head 26 at one end, an intermediate portion 28 and a fastening section 30 at the opposite end. Intermediate section 28 and fastening section 30 are progressively smaller in transverse dimension than the preceding section thereby forming spaced shoulder means 29 and 31 respectively. The transverse dimension of head 26 at shoulder 29 is greater than the internal measurement of sleeve 12, for purposes best set forth hereinafter.

A retaining portion 34 is associated with the stud portion 24 to complete the fastener. Retaining portion 34, in the present embodiment, includes a base 36 and a plurality of legs 38 extending upwardly from said base, the present embodiment contemplating three such legs 38. Base 36 is provided with a central aperture 40 which is complemental to and adapted to telescopically accept the fastening section 30 of the stud portion with the shoulder 31 engaging the base 36 about the aperture 40. Fastening section 30 is telescoped within aperture 40 and then staked over by suitable means, such as peening, to retain the stud portion 24 in fixed association with the retaining portion 34. The legs 38 are connected to and extend substantially normal to base 36 for a substantial distance and diverge outwardly and then inwardly to provide shoulder means 44. The free extremity of legs 38 are slightly bent to provide a cam surface 46. A barb 48 may be provided on each of the legs 38 and can be obtained by lancing the material from legs 38 intermediate its margins, preferably at the point where leg 38 diverges from its initial vertical connection to the base 36, for purposes best set forth hereinafter.

To assemble the fastener with a sleeve type stud, the cam surfaces 46 ride over the outer surface 52 of the sleeve 12 while the tapered bullet shaped head 26 is inserted into bore 54 of the sleeve 12. As was previously mentioned, the largest diameter of the tapered head 26 is controlled so as to be greater than the internal diameter of the bore 54. In the case of die cast metal escutcheons utilizing sleeve type studs, this diametral relationship normally is controlled to provide an interference fit between the major diameter of head 26 and the bore 54. In the case of plastic escutcheons, the diameter of head 26 is controlled so as to be larger than the internal diameter of bore 54 and the sleeve 12 will deform radially outwardly as the head 26 is telescoped within the sleeve and, because of the resilient nature of the plastic material, as well as cold flow of plastic material, the plastic sleeve will tend to return to its original diameter and form an abutment behind the shoulder 29. The legs 38 may embrace the outer surface of the sleeve and the barbs 48 will dig into said outer surface to assist in the retention of the fastener relative to the sleeve.

Referring to FIG. 3, the escutcheon and preassembled fastener 14 are axially telescoped within the aperture of the plate 18, shown in phantom, forming the outer surface of a typical housing to which the escutcheon is applied. The arms 38 deflect inwardly, as shown in phantom, until they pass beyond the opposite side of plate 18 and the shoulders 44 engage the under surface of the plate 18 adjacent the aperture to retain the escutcheon in mounted position.

In the embodiment described above, it will be noted that the axial length of sleeves 12 has been controlled to permit their passage through the aperture 16. Shorter sleeves 12 could be utilized in combination with a longer stud portion 24, since the sleeve does not, of necessity, have to project entirely through the aperture 16. Such a decision is a matter of design choice, resting with the user of the fastener embodied in this invention.

A modification to the invention is found in FIG. 5 of the drawing, wherein similar parts are designated by similar numerals with the addition of the suffix "a." In this modification, the sleeve 12a is rectangular in configuration and the stud portion 24a is non-circular and complementary thereto. In the original embodiment, the stud portion and retaining member were designed for utilization with a round sleeve and round aperture and hence, the shoulder 29 was annular in configuration and the retaining portion 34 was three legged to provide stability in a round aperture. In the present modification the stud portion 24a is provided with a tapered head 26a and a pair of opposed shoulder portions 29a. The fastening section 30a is rectangular in configuration and is adapted to be telescopically accepted within a rectangular slot 40a in the base 36a of the retaining portion 34a and deformed to permanently assemble 24a and 34a as a single unit. In this embodiment, only two legs 38a are necessary when it is utilized with a rectangular aperture in the plate (not shown). The operation of the presently described embodiment is substantially identical to the first embodiment described in that the head 26a is retained within the rectangular sleeve member 12a and the attached stamping comprising retaining member 34a is engageable within the aperture of a suitable panel for retention of the entire assembly to the panel.

The embodiment shown in FIG. 6 is a modification to the two previous embodiments and wherein similar parts are described by similar numerals with the addition of the suffix "b." The stud portion in this embodiment is substantially circular in cross section and is associated with a rectangular sleeve member 12b and a rectangular retaining portion 34b. When the assembly of sleeve, stud and retaining portion is utilized in a square or rectangular aperture (not shown) it is possible to move the escutcheon plate laterally, for adjustment purposes, due to the ability of circular stud 24b to move laterally within the rectangular sleeve 12b.

A further modification of the present invention is shown in FIG. 7. In this embodiment, the fastening device is a one piece sheet metal stamping as opposed to the two piece configuration previously described. It includes a base portion 60 which in this embodiment is generally noncircular in configuration having along at least one edge thereof a stud portion 62 extending outwardly substantially normal to base 60. The opposite end of stud portion 62 presents a tapered nose portion 64 and axially spaced along stud section 62 behind the tapered nose 64 are one or more pairs of shoulders or barbs 66, a similar stud portion 62 can be attached to and extend from the opposite edge of base 60 where the fastener is to be utilized in a square or rectangular sleeve member, however, should it be desired to utilize the fastener with a sleeve having a single narrow slot, then it is possible to eliminate one of the stud portions 62.

Extending upwardly from opposite sides of base 60, intermediate the sides supporting stud portions 62, are a pair of panel engaging legs 68. These legs have divergent and converging portions to form a shoulder 70 and are similar in function to the leg portions 38 previously described in the other embodiments. Additionally, the leg 68 can be provided with lanced out barbs 72 which extend inwardly and are adapted to imbed themselves in the outer surface of the sleeve to retain the fastener in assembled relationship thereto.

Still another embodiment of the present invention is shown in FIG. 8, wherein similar numerals are utilized to designate similar parts with the addition of the suffix "c," and contemplates a sheet metal form of stud portion. This stud portion 24c is generally an elongated U shaped sheet metal member having a relieved or tapered nose portion 26c and having a shoulder formed by a sheared or lanced barb 29c which serves to engage the inner surface of the sleeve with which it will be associated. In the first three embodiments, the stud portion 24 was associated with the retainer portion 34 by staking over the fastening section 30 of the stud portion 24. In this embodiment, the stud portion 24c is provided with a pair of hook or bend tabs 80 positioned at the free corners at one end of the U shaped body portion and a bend tab 82 is positioned at the same end in the base of the U section of the body portion. These tabs would then be respectively associated with three suitable apertures in the base 36 of a retaining portion 34 (not shown). The hook or bend tabs 80 would be inserted into two apertures so that they would underride the base portion and then the bend tab 82 would fall into a third aperture and be deformed into engagement with the under surface of the base 36 so as to retain the stud portion 24c with a retaining portion 34 (not shown), of the type generally shown hereinabove except for the modified base apertures.

The various embodiments of the invention disclosed hereinabove provide a quick and novel means of attaching sleeve type stud members to apertured panels. While the preferred embodiment shows the sleeve passing through the aperture in a panel, it is not an absolute necessity, as previously mentioned, since the stud portion can be increased in length so as to project up into the body of the escutcheon or workpiece. While several forms have been disclosed which embody the teachings of this invention, it is felt that structural modifications to the forms of the device will be apparent to those skilled in the art and it is my intent to be limited only by the appended claims.

I claim:

1. A fastener for mounting a workpiece to an apertured panel, said workpiece being provided with an abutment means to engage one side of the panel and at least one sleeve type stud member integral with and projecting through the aperture in the panel and outwardly away from said workpiece, said fastener element having means to retain it relative to said panel and further being complementally accepted within said sleeve type stud member, means intermediate the extremities of said fastener for securing same on and axially relative to said sleeve type stud member, whereby upon mounting of said workpiece with its projecting sleeve type stud member on the apertured panel the fastener element makes fastener engagement with the sleeve of said workpiece to clampingly engage the workpiece and the fastener relative to said apertured panel.

2. A fastener of the type claimed in claim 1 wherein said fastener is tapered at one end to facilitate entry into said sleeve type stud member, said intermediate means formed by said fastener being relieved adjacent said tapered portion to form shoulder means adapted to engage the interior of said sleeve.

3. A device of the type claimed in claim 1 wherein said means for retaining the fastener to the panel includes a sheet metal means having a base and a plurality of arms extending from said base, said base having means for attachment to said fastener, said arms extending in the same direction as the fastener in spaced relation thereto and adapted to embrace said sleeve type stud with the sleeve positioned between said fastener and said arms, said arms further being provided with means adapted to cooperate with said aperture in said panel to retain the workpiece in assembled relation to the panel.

4. A device of the type claimed in claim 1 wherein said fastener is a one piece sheet metal stamping including a stud portion, said intermediate means comprising laterally extending means at one end of said stud portion adapted to be complementally accepted in said sleeve with said laterally extending means engaging the interior wall of said sleeve, base means extending from the opposite end of said stud portion a plurality of legs extending from said base means and adapted to engage the panel aperture to retain the fastener and workpiece as an assembly to the panel.

5. A device of the type claimed in claim 4 wherein said panel engaging legs extend in the same direction as said stud portion and are spaced therefrom, said legs adapted to embrace the outer surface of said sleeve when the stud portion is telescoped into the sleeve, said legs having resilient shoulder means for engaging the panel adjacent said aperture.

6. A device of the type claimed in claim 5 wherein said legs include means for positively engaging the exterior surface of said sleeve to assist said laterally extending means on said stud portion in retaining the fastener on said sleeve.

7. A fastener installation including an apertured panel, a workpiece and a fastener, said workpiece having one or more deformable sleeve type stud members extending rearwardly therefrom, a fastener for each of said sleeves, each of said fasteners including a stud portion and a retaining portion, said stud portion being complementally accepted within one of said sleeves and having laterally extending means adapted to engage the interior wall of said sleeve, said retaining portion attached to said stud portion and including means to engage said panel aperture and retain the workpiece in mounted relation to said panel.

8. An installation of the type claimed in claim 7 wherein the stud portion of said fastener is one piece, a fastening section at one end, an intermediate section, and said laterally extending means adjacent the opposite end, said laterally extending means comprising a head which is tapered outwardly from its extremity and terminates in a laterally disposed shoulder means at its juncture with said intermediate section, said head being adapted to deform said sleeve when telescopically associated therewith and said sleeve being adapted to engage said head behind said shoulder means, said retaining portion being connected to said stud portion at said fastening section and further including at least two or more legs adapted to engage said panel adjacent said aperture for retaining said workpiece in mounted relation to said panel.

9. An installation of the type claimed in claim 8 wherein each of said sleeve member extends rearwardly from said workpiece sufficiently far so as to extend into the aperture in said panel when the workpiece is seated on the panel, said retaining portion being of resilient sheet metal having an apertured base and said legs extending substantially normal to said base, each of said legs having shoulder means for underlying said panel, said fastening section having a protuberance reduced in size from said intermediate portion and adapted to be accepted within the apertured base of the retaining portion and staked over to assemble the two portions into a single unit, said sleeve being formed of deformable material, said head on said stud portion having a greater transverse measurement than the internal measurement of said sleeve whereby telescopic association of the head in the sleeve results in deformation of the sleeve during insertion of the head and a subsequent contraction of the sleeve behind the shoulder to its initial shape to thereby retain the stud portion within the sleeve and hence, permit retention of the workpiece to the apertured panel.

References Cited by the Examiner

UNITED STATES PATENTS 3,214,878   5/1964   Duffy et al. _____ 24—73

JOHN E. MURTAGH, *Primary Examiner.*

FRANK L. ABBOTT, *Examiner.*

A. B. WILLIAMS, *Assistant Examiner.*